United States Patent

Nesheim et al.

[11] Patent Number: 5,881,639
[45] Date of Patent: Mar. 16, 1999

[54] CHEESE MOLDER/CHILLER WITH CLOSED WATER CYCLE

[75] Inventors: Gary Nesheim, Hartland; Sullivan Brennan, Windsor; Edward Brogan, DeForest; Peter Nelles, Blue Mounds; Ken Westby, Edgerton, all of Wis.

[73] Assignee: Johnson/Nelles Corporation, Windsor, Wis.

[21] Appl. No.: 950,846

[22] Filed: Oct. 15, 1997

[51] Int. Cl.⁶ ............................ A01J 25/00; A23C 19/00
[52] U.S. Cl. ................ 99/455; 99/452; 99/453; 99/460; 425/149; 425/261; 425/350
[58] Field of Search ............... 99/452–455, 458, 99/459, 460, 464, 465, 466, 483, 517; 426/231, 512, 582, 36; 425/149, 258–261, 244–348 R, 350, 351, 444, 447, 449, 200, 552, 577, 547

[56] References Cited

U.S. PATENT DOCUMENTS

| | | |
|---|---|---|
| 4,293,296 | 10/1981 | Caiello et al. ........................ 425/547 |
| 4,592,274 | 6/1986 | Tomatis ................................... 99/452 |
| 4,608,921 | 9/1986 | Mongiello ............................... 99/455 |
| 4,613,294 | 9/1986 | Rose et al. ......................... 99/455 X |
| 4,665,811 | 5/1987 | Meyer ..................................... 99/455 |
| 4,679,497 | 7/1987 | Tomatis ................................... 99/455 |
| 4,682,538 | 7/1987 | Zahlaus ................................... 99/453 |
| 4,898,745 | 2/1990 | Zamzow et al. ....................... 426/582 |
| 5,125,329 | 6/1992 | Tomatis ................................... 99/453 |
| 5,301,605 | 4/1994 | Tomatis ................................... 99/459 |
| 5,480,666 | 1/1996 | Lindgren ............................ 99/455 X |
| 5,505,608 | 4/1996 | Tomatis ................................. 425/261 |
| 5,529,795 | 6/1996 | Aldrovandi ........................ 99/452 X |

*Primary Examiner*—Timothy F. Simone
*Attorney, Agent, or Firm*—Quarles & Brady

[57] ABSTRACT

A molder/chiller for pasta filata cheeses uses segmented water jackets each holding a plurality of mold tubes. The jackets may be separately filled with chilled water for chilling and heated water for releasing the cheese blocks as a wheel rotates made up of the jackets rotates. A central water distribution valve and manifold with radiating source and sink pipes allows simple closed loop cooling and heating fluid circulation reducing contamination and providing improved energy efficiency and elimination of the need for Teflon coatings. Rotation of the distribution manifold may provide the needed valving action without separate controllers.

15 Claims, 5 Drawing Sheets

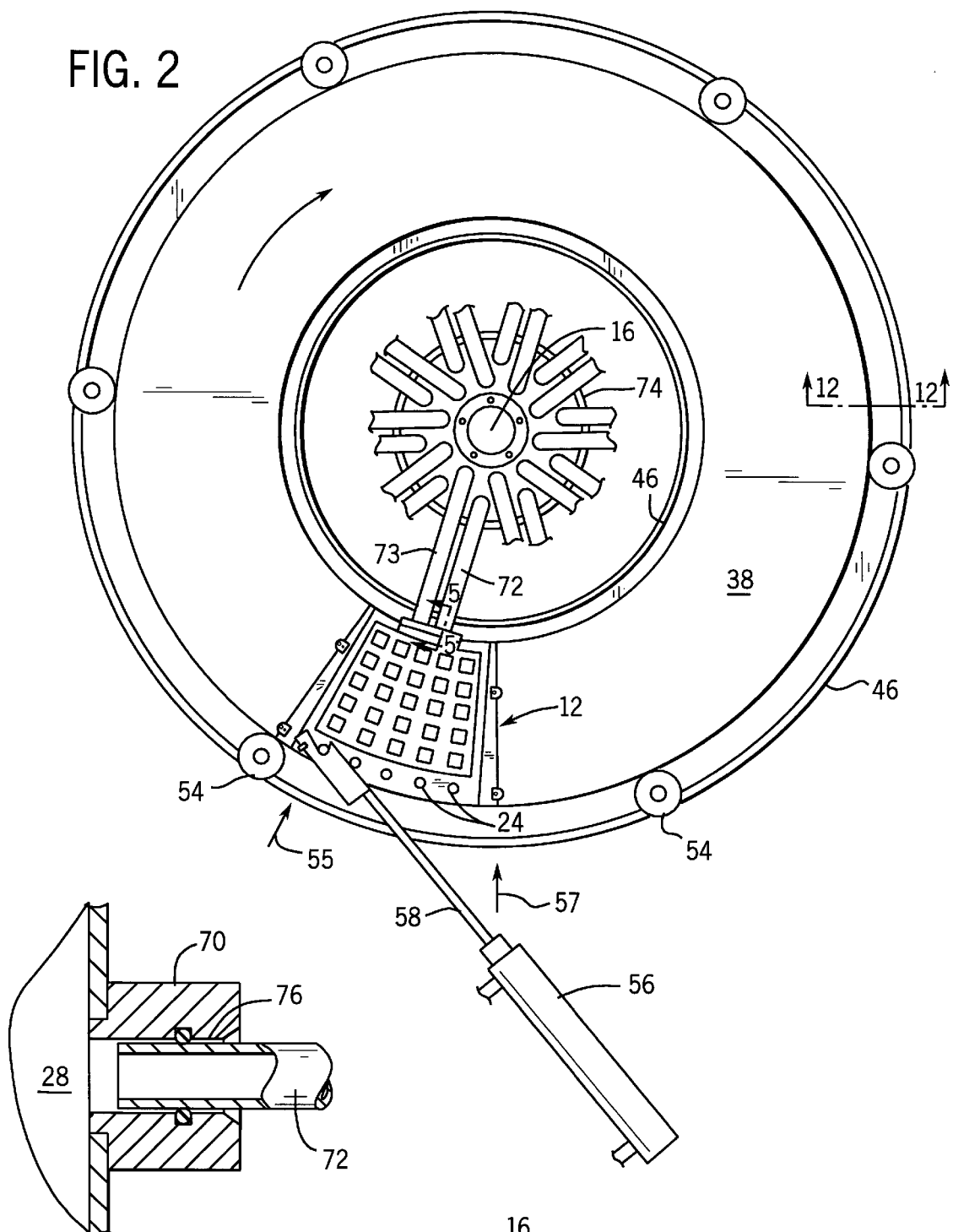
FIG. 2
FIG. 5
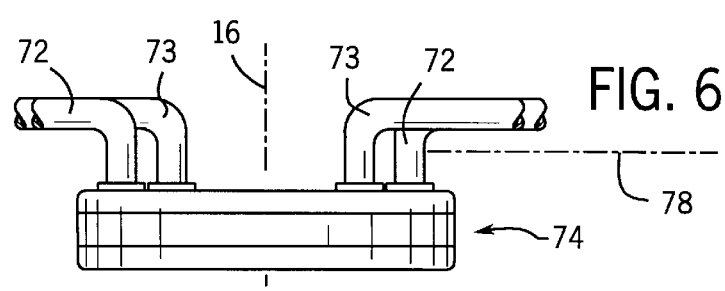
FIG. 6

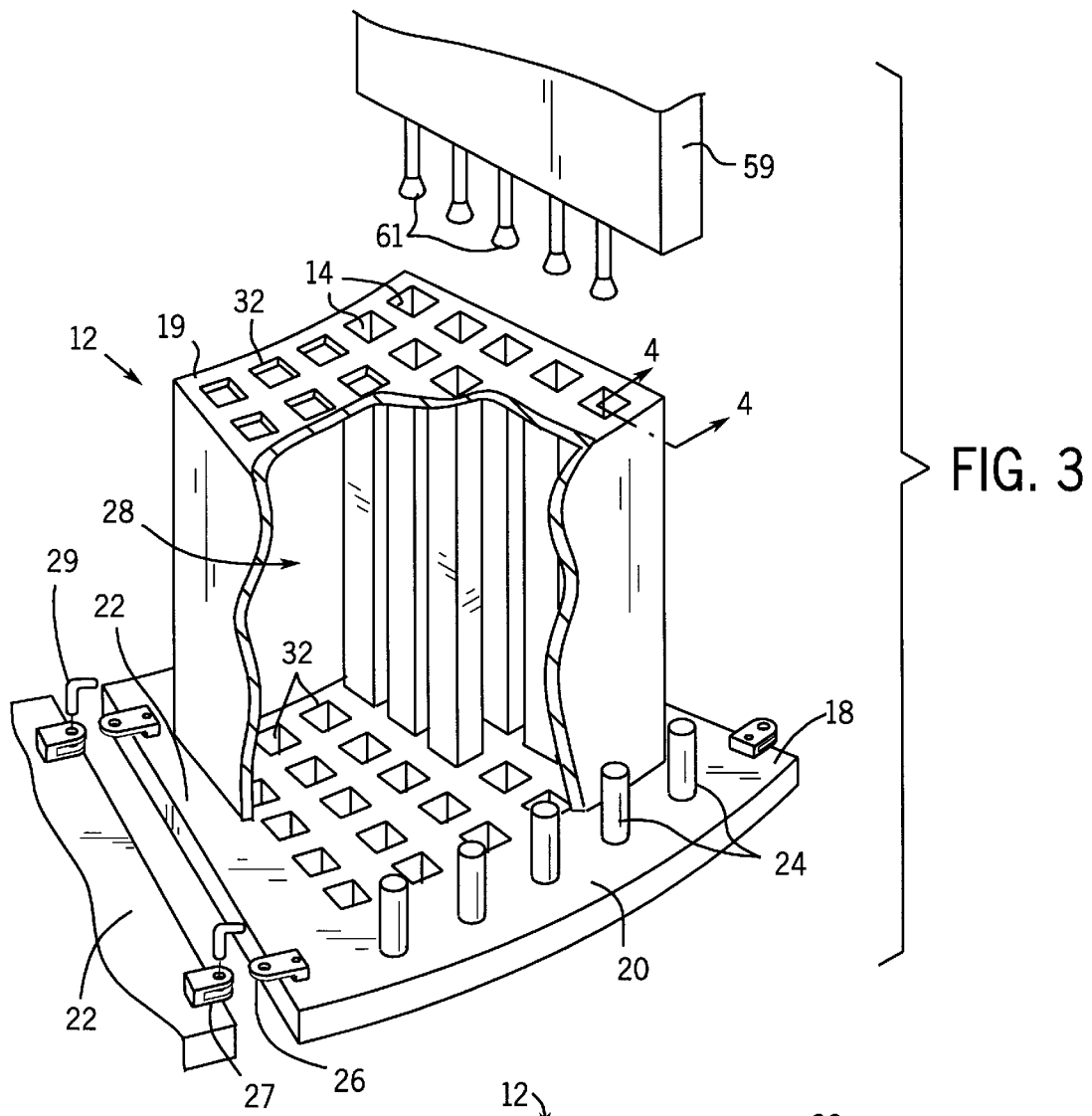
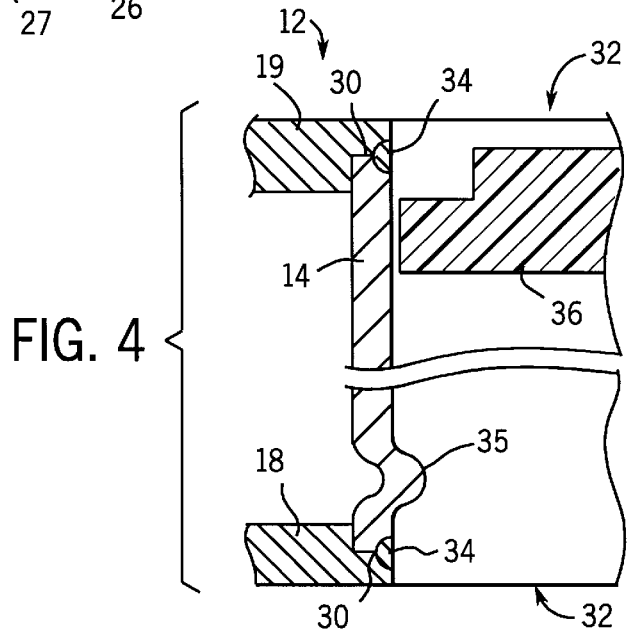

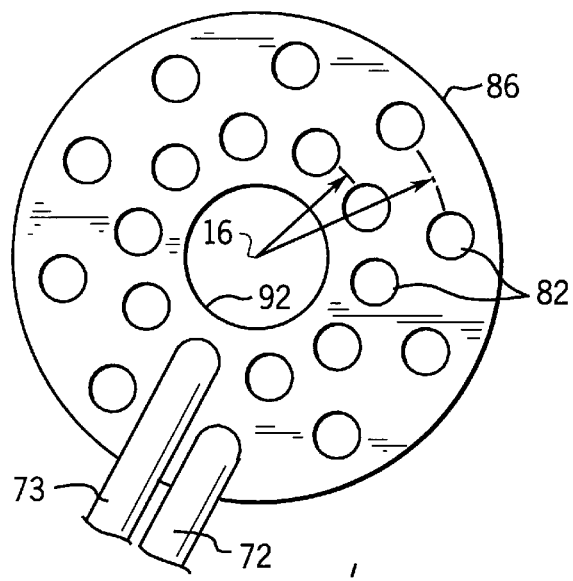
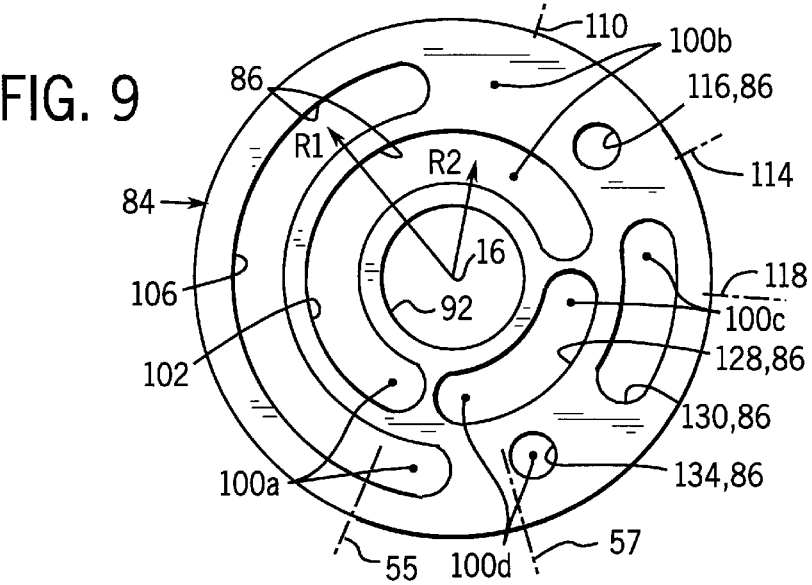
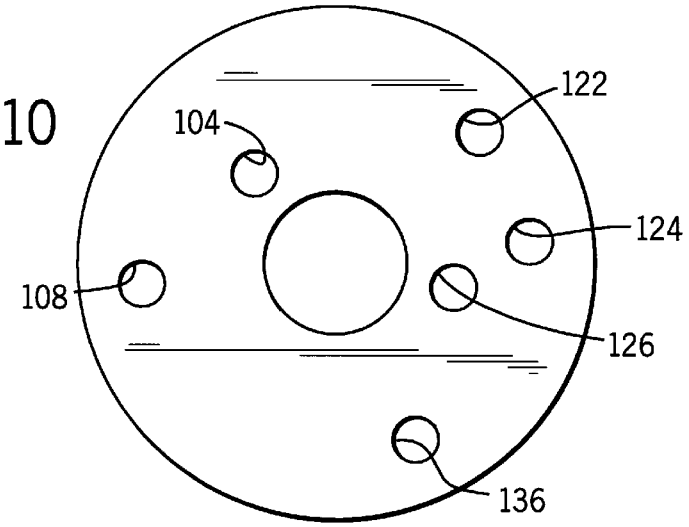

CHEESE MOLDER/CHILLER WITH CLOSED WATER CYCLE

CROSS-REFERENCE TO RELATED APPLICATIONS

STATEMENT REGARDING FEDERALLY SPONSORED RESEARCH OR DEVELOPMENT

BACKGROUND OF THE INVENTION

The invention relates generally to a molder/chiller for the production of pasta filata cheeses such as mozzarella cheese, and in particular for an improved molder/chiller for forming the cheese into self-sustaining loaves.

Pasta filata (plastic curd) cheeses are Italian type cheeses in which the curd is worked to develop a fiber or string-like texture providing an elasticity to the finished cheese as is desired by consumers. In particular, pasta filata cheeses are kneaded while the curd is still in the plastic state to develop the desired texture. This kneading was originally performed by hand, but now may be performed by motor-driven cooker/stretchers. In one cooker/stretcher design, augers fitting loosely within a trough, stretch and compress the cheese curd as it is conveyed along the extent of the trough. The stretching develops the fiber or string-like quality for which pasta filata cheeses are valued. The kneading process is conducted at approximately 140° Fahrenheit sufficient to provide plasticity to the cheese, but below the melting point of the cheese where the fiber structure of the cheese would be lost through melting.

Once the structure of the cheese has been developed, the cheese curd is transferred to a molder/chiller system which divides the curd into blocks and cools it. The cooled cheese blocks may then be transferred to a brining pit in which cold brine chills and floats the blocks to prevent deformation during the remaining cooling process. The chilling in cold brine also adds some salt to the cheese. When the cheese block center core has reached approximately 45° to 55° Fahrenheit and has the desired salt content requested by the industry of 1.2 to 1.7% it may be packaged.

Cooker/stretchers, molder/chillers and brining systems are commercially available from the Johnson/Nelles Corporation of Windsor, Wis.; the assignee of the present invention.

In a typical molder/chiller, heated pasta filata cheese from the cooker/stretcher is extruded into tubular molds whose outer surfaces are then brought into contact with chilled water either from sprayers or by immersion in a water tank. The cooling water is continuously recycled through a cooling system to conserve costs. Because the cooling water is open to the air it may accumulate contaminants and raises the possibility of transferring the contaminants to the cheese being processed.

For this reason, it is known to isolate the cooling water from the mold tubes through use of a jacket surrounding the mold tubes through which cooling water may be circulated. The jacket may be in the form of a horizontal wheel with the mold tubes extending vertically through the wheel as held in a plastic matrix. The mold tubes are open at their top and bottom surface for the introduction of the heated cheese and the removal of the cooled blocks. The cheese contacting inner surfaces of the mold tubes are coated with Teflon to permit the ready extraction of the cooled cheese blocks under the force of plungers extending into the mold tubes.

Over time the Teflon coating may become damaged and Teflon particles may flake off into the formed cheese. Restoring the Teflon layer is difficult or impossible as it requires the molds (as affixed to the water jacket) to be heated to high temperatures.

BRIEF SUMMARY OF THE INVENTION

The present invention provides a molder/chiller that simultaneously provides the benefit of a closed cycle of cooling liquid and which eliminates the problems inherent in the use of a Teflon release material for the mold tubes. A wheel of liquid jacketed mold tubes is broken into a set of individually removable segment shaped mold cages each providing closed liquid flow around a set of mold tubes through individual liquid flow tubes. The liquid flowing through the mold cages is cycled between chilling liquid and heated liquid the latter which serves to release the cheese from the mold tubes without the need for a special release surface such as Teflon.

Specifically, the present invention is a molder/chiller for pasta filata cheeses employing a plurality of mold cages each providing a separate enclosed liquid flow volume around a plurality of mold tubes. A cheese inlet port in the molder/chiller allows passage of cheese into the mold tubes at a first station and a cheese outlet port allows passage of cheese out of the mold tubes at a second station. A cage carrier supports the mold cages for movement about a central axis between the first and second stations. At least one liquid flow tube is attached to each of the mold cages for separately supplying liquid to the liquid flow volumes of the mold cage and a distribution valve assembly alternates the supply of heated and chilled liquid among different liquid flow tubes with movement of the mold cages on the mold carrier between the first and second stages. The heated liquid is supplied to the mold cages prior to the second station to release the cheese within the mold tubes from the mold tubes.

Thus, is it one objection of the invention to provide a practical closed loop cooling system for a molder/chiller eliminating the problems of using a limited-life release surface on the mold tubes. The use of a heated liquid to release the cheese allows the mold tubes and cages to be constructed with a hygienic unitary stainless steel surface.

It is another object of the invention to permit a practical use of heated liquid for releasing of cheese from mold tubes. By partitioning the molds into separate cages, heating and cooling liquid may be kept separate and some cheese may be cooling while other cheese is being released.

The mold cages may be annular sectors to fit together into a wheel to move about a central axis when supported by the cage carrier. The distribution valve assembly may include a rotary liquid distribution manifold positioned at the central axis. The liquid flow tubes may attach to the mold cages by means of expandable couplings to accommodate radial motion of the mold cages with respect to the central axis.

Thus is it another object of the invention to provide a simple liquid distribution system for the separate mold cages. By forming the mold cages into a wheel structure they maintain a nearly constant distance from the distribution manifold allowing simplified liquid distribution. Slight eccentricity in the movement of the mold cages about the central axis is accommodated by the expansion joints.

The rotary manifold may include a first manifold plate moving with the mold cages and having a plurality of circumferentially spaced manifold openings communicating with ones of the liquid flow tubes. The distribution valve assembly may alternate supply of the heated and chilled liquid among the different liquid flow tubes by means of an orifice plate having orifices communicating with the sources of heated and chilled liquids where the orifices are positioned to align and move out of alignment with the manifold openings with relative motion of the orifice plate and the manifold plate with movement of the mold cages.

Thus, is it another object of the invention to provide a robust and simple method of controlling the flow of heated and cooled liquid to the mold cages as a function of their position in movement between the first and second stations. By locking the manifold plate to move with the mold cages, proper sequencing is provided without the need for separate valving or electronic control systems and sensors.

The liquid flow volume of each mold cage may be isolated from the inner cheese contacting surface of the mold tubes and each mold cage may receive at least two liquid flow tubes. The distribution valve may alternately connect the two liquid flow tubes with one of a heated liquid source, a chilled liquid source, a chilled liquid return and a heated liquid return.

Thus it is another object of the invention to completely isolate the cooling and heating liquids from each other and from the cheese contacting surfaces thereby reducing the possibility of contamination and conserving energy needed to heat and cool the liquids.

The distribution valve assembly may be positioned below the liquid flow volumes of the mold cages.

It is a further object of the invention to provide a rapid draining system where gravity may provide for liquid flow through both of the liquid flow tubes during a portion of a draining cycle.

Each mold cage may include a set of baffles to circulate liquid received from the liquid tubes pass the mold tubes prior to the liquid exiting the mold cage.

Thus it is yet another object of the invention to allow a rapid even temperature control of the mold tubes as the mold cages are cycled between hot and cold liquids.

The mold cage may include generally planar opposed stainless steel walls having a plurality of openings, having a dimension conforming to the inside dimension of a mold tube opening and undercut to a dimension corresponding to an outside dimension of the mold tubes. The mold tubes may be stainless steel and may extend between the walls to fit into the undercuts and to be attached by welding at the openings.

Thus it is another object of the invention to provide a method of constructing a mold cage for a number of mold tubes and presenting a continuous stainless steel surface. By use of the undercutting process, the mold tubes may be welded to the mold cage so that the thermal forces of contraction and expansion, incurred during the welding process, align at the mid-line of the mold cage walls to eliminate warping.

The mold tubes may extend vertically from a lower surface of the mold cages and open through that lower surface and the cage carrier may be a circular table having an upper surface receiving the lower surface of the mold cage that may slide thereon. The cheese inlet port and cheese outlet port may be ports cut in the upper surface of the cage carrier to align with the openings of the mold tubes at the first and second stations, respectively.

Thus it is yet another object of the invention to provide a simple method of supporting segmented mold cages for rotation about a common axis that allows for filing and emptying of the mold tubes. The orifices in the upper surface of the caged carrier table provide a knife edge cleanly separating of the cheese in the mold tube from the source auger as the mold cages move.

The interface between the annular sectors of the mold cages may include a cleaning fluid passage to permit passage of cleaning fluid through the mold cages to the cage carrier.

Thus, it is another object of the invention to allow the molder/chiller of the present invention to be cleaned in place.

The mold cages may include index teeth spaced along an exposed edge of the mold cage with a spacing related to the spacing of the mold tubes. The molder/chiller may include an indexing arm engaging with the indexing teeth on the mold cage to move the mold cage by an index amount determined by the spacing of the index teeth.

Thus is another object of the invention to allow different mold cages to be used having different spacings of mold tubes. The molder/chiller index arm then automatically moves the mold cages by the proper amount as a result of the spacing of the index teeth on the individual mold cages.

The indexing arm may include a sensor detecting the indexing teeth so as to limit its motion in accordance with the spacing between the index teeth.

It is thus another object of the invention to allow for efficient motion of the indexing arm. The sensor may stop the index arm retraction once it has engaged the next index tooth prior to its completing a full retract stroke.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 2 is a plan view of the molder/chiller of FIG. 1 showing the positioning of the mold cages about a central valve assembly having a rotating water distribution manifold communicating with the mold cages through liquid flow tubes;

FIG. 3 is a detail, cut-away, perspective view of one mold cage showing its means for interfitting with other mold cages to form a wheel and showing the enclosed liquid flow volume between the mold tubes;

FIG. 4 is a cross-sectional fragmentary view of one mold tube taken along line 4—4 showing the fitting of the ends of the mold tube into peripheral notches surrounding apertures in the end plates of the mold cages so as to reduce warping after welding;

FIG. 5 is a cross-sectional view taken along line 5—5 of FIG. 2 showing an expansion joint connecting the liquid flow tubes to the mold cages and allowing for eccentricity in the rotation of the mold cages about the water distribution manifold of FIG. 2;

FIG. 6 is a side elevational view of the valve assembly of FIG. 2 showing its placement below the water flow volume of the mold cages;

FIGS. 8–10 are plan views of the manifold plate, orifice plate and base plate of FIG. 7, respectively;

DETAILED DESCRIPTION OF THE INVENTION

Figure 1:
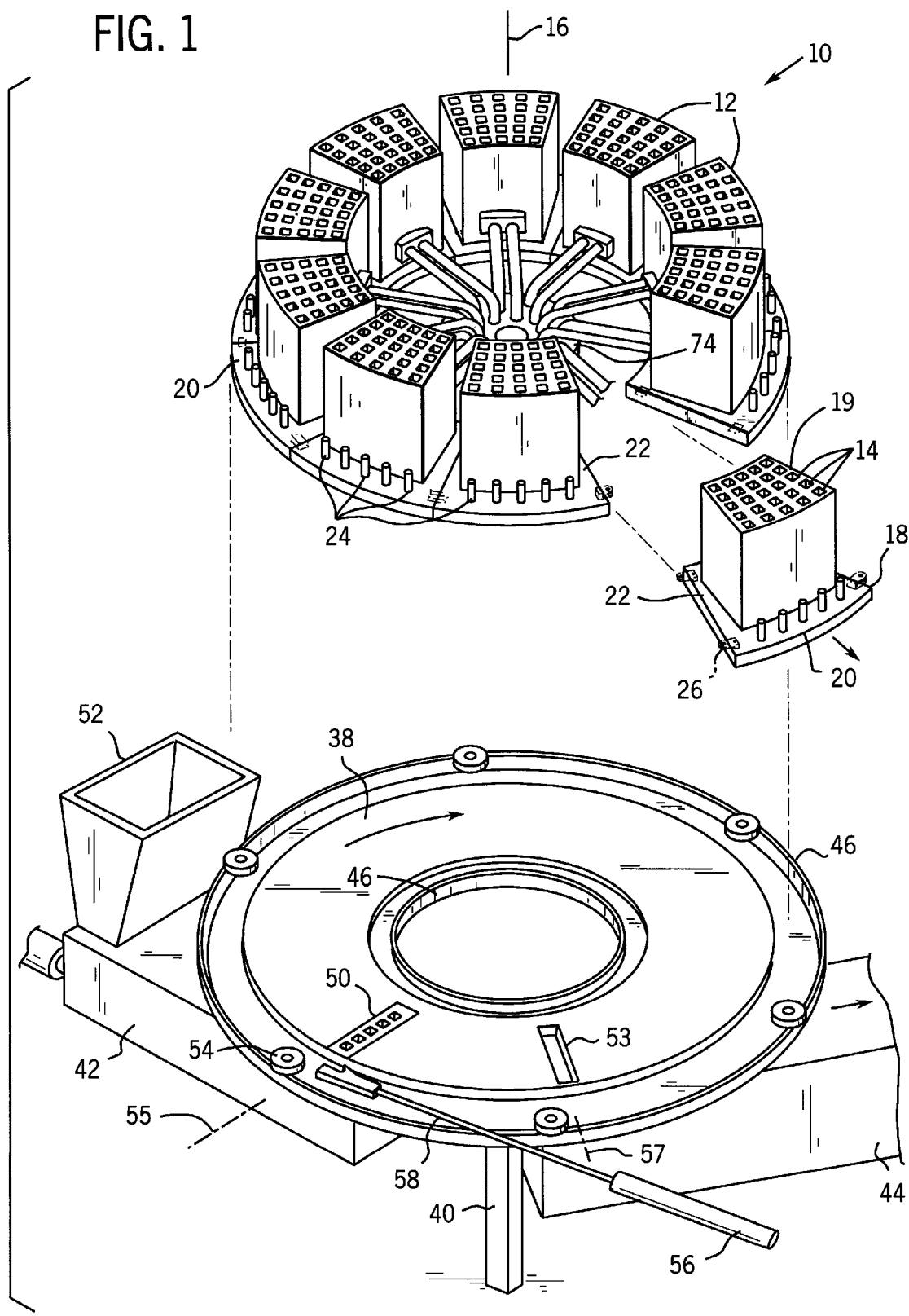
FIG. 1 is an exploded perspective view of the molder/chiller of the present invention showing arcuate mold cages each holding mold tubes and supported on a cage carrier surface to rotate in a clockwise manner between a first station, in which the mold tubes are filled, and a second station, in which the mold tubes are emptied, as driven by an indexing arm operating on index pins on the mold cages.

Referring now to FIG. 1 a molder/chiller 10 of a present invention includes a number of arcuate mold cages 12 each supporting vertically extending mold tubes 14 opening through top and bottom plates 19 and 18 of the mold cage 12. The mold cages 12 enclosed an annular cylindrical water flow volume (not visible in FIG. 1) surrounding the mold tubes 14. The mold cages 12 fit together to form an annular wheel extending horizontally about a central axis 16. The mold tubes 14 are arranged in rows extending along lines of radius from axis 16.

Referring also to FIG. 3, the bottom plate 18 of each mold cage 12 extends beyond the vertical walls of the mold cage 12 to provide a radially extending outside flange 20 and circumferentially extending side flanges 22. Vertically extending index pins 24 protrudes upward from the outside flange 20 aligned with each of the rows of the mold tubes 14 as will be used for indexing the mold cages 12 described below.

One side flange 22 of each mold cage 12 includes circumferentially extending eyes 26 that are received in clevises 27 in the opposing side flange 22 of an adjacent mold cage 12 and held in those pockets by clevis pins 28 passing through the devises 27 and the eyes 26. Referring again to FIGS. 1 and 2 when the side flanges 22 of the mold cages 12 are thus assembled together, the resulting wheel may rotate as a unit around the axis 16 as supported on a carrier surface 38 being generally an annular disc conforming to the dimension of the wheel of mold cages 12.

Referring to FIG. 1, the carrier surface 38 is supported above the factory floor by support beams 40 so as to allow a cheese auger 42 and brine tank 44 to be placed underneath the carrier surface 38. As the mold cages 12 move in clockwise direction about the central axis 16 on carrier surface 38, they pass over radially extending cheese inlet ports 50 having equal space and size to one row of the mold tubes 14 and their apertures 32 in bottom plate 18. The cheese inlet ports 50 are formed by an upward extending portion of the cheese auger 42 which receives cheese through hopper 52 and passes it along the extent of the cheese auger 42 by means of a motor driven auger upward through the cheese inlet ports 50. The cheese inlet ports 50 may be replaced for different sizes of mold tubes 14.

The cheese inlet ports 50 define a first station 55 at which each of the rows of mold tubes 14 may pass. Displaced slightly counter-clockwise from the cheese inlet ports 50 is a cheese outlet port 53 positioned over the brine tank 44 to receive the completed molded cheese. The cheese outlet port 53 defines a second station 57.

Referring to FIG. 3, positioned above the second station 57 is a pneumatic cylinder set 59 having plungers 61 aligning with the centers of the mold tubes 14 when the mold tubes 14 are at station 57. The plungers 61 may be activated to push downward on the plugs 36 shown in FIG. 4 to eject formed cheese through cheese outlet port 53.

Figure 12:
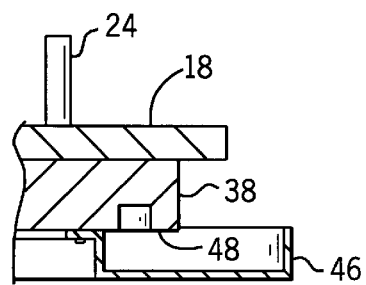
FIG. 12 is a cross section along line 12—12 of FIG. 2 showing a drip ridge and channel for collecting water and fat expressed from the cheese within the mold tubes.

Referring now also to FIG. 12, water and fat expressed through the lower apertures 32 in bottom plate 18 may pass over the outer periphery or inner periphery of the carrier surface 38 into channels 46 for collection. A notch formed in the lower surface of the outer periphery or inner periphery of the carrier surface 38 provides a drip ridge 48 to ensure that such liquids are collected by the channel 46. The channel may communicate with a drain (not shown).

Referring also to FIGS. 1 and 3, the upper side of the mold cages 12 allow a passage for cleaning fluid so that the molder/chiller 10 may be cleaned in place by a downward spray of cleaning fluid that passes around the mold cages 12 and through the mold tubes 14 to clean the interface between the mold cages 12 and the carrier surface 38, the cleaning fluid then collecting in the channels 46.

Referring to FIG. 2, when the mold cages 12 are assembled together into a wheel and placed on the carrier surface 38, the outer periphery of the wheel formed by outer flanges 20 engage peripheral guide rollers 54 placed above the channel 46 and within its radius to guide the mold cages 12 in a regular orbit about axis 16. A hydraulic cylinder 56 is positioned to extend an arm 58 tangentially to the rim of the wheel so formed by flanges 20.

Figure 11:
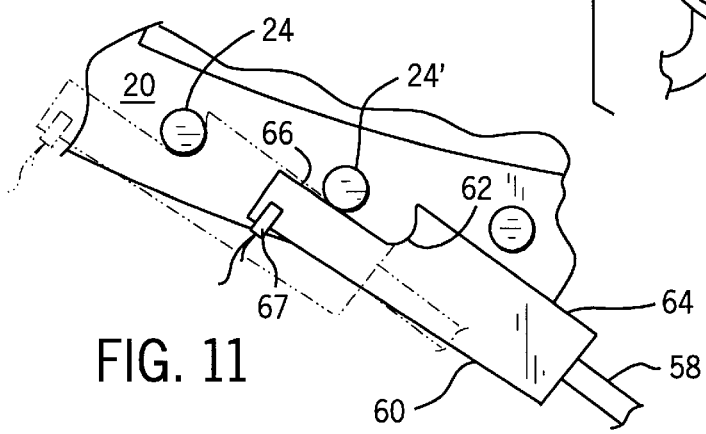
FIG. 11 is a detailed view of two positions of a pawl attached to the actuator arm of FIG. 1 in advancing the molds through the use of the index pins.

Referring also to FIG. 11, the end of the arm 58 includes a pawl 60 having a forward extending hook 62 that may engage a index pin 24 to rotate the mold cages 12 when the arm 58 is extended from the cylinder 56. Between the hook 62 and the arm 58 is a guide surface 64 that rests against a next index pin 24' disposed counterclockwise from index pin 24 to be engaged as the pawl 60 is retracted from the index pin 24. As the cylinder 56 retracts, hook 62 passes by index pin 24 and index pin 24' engages a throat portion 66 of the pawl 60 opposite the hook 62 with respect to the guide surface 64. The throat portion 66 holds a proximity sensor 67 which signals a control system (not shown) to cause the hydraulic cylinder 56 to cease retracting and to begin its forward stroke. Upon the forward stroke, the hook engages index pin 24' to push it to the position previously occupied by index pin 24. Thus, the advance of the mold cages 12 for each stroke of the hydraulic cylinder 56 is determined by the angular spacing of the index pins 24 on the mold cages 12. Accordingly, varying spacing of the pins 24 permit the use of different mold cages 12 having different sized mold tubes with different spacings between rows along the circumferential direction.

The hydraulic cylinders 56 and the pawl 60 are placed to complete their stroke at the centerline of the cheese inlet ports 50 to ensure accurate alignment of a given mold cage 12 with the cheese inlet ports 50.

Referring now to FIG. 4, the mold cage 12 and the mold tubes 14 may be stainless steel with the mold tubes 14 welded directly to the top and bottom plates 19 and 18 at apertures 32 cut into top plate 19 and bottom plate 18 to allow access to the interior of the mold tubes 14. This welding is accomplished without warping of the top plate 19 and bottom plate 18 by fitting of the mold tubes 14 into notches 30 opening to the water flow volume 28 providing an inset around the apertures 32. The notches 30 extend outward from the apertures 32 by an amount equal to the wall thickness of the mold tubes 14 and extending into the top and bottom plates 19 and 18 by half the thickness of those plates 18 and 19. Accordingly, weld beads 34 used to connect mold tubes 14 to plates 18 and 19 produce thermal stress aligned along a plane bisecting plates 18 and 19 to produce significantly reduced warping. The ability to weld these parts for assembly allows the production of an essentially continuous stainless steel surface without exposed epoxy fillers or chemically reactive materials.

Positioned within each mold tube 14 is a floating plastic plug 36 that will move up and down to cap the cheese injected into the mold tubes 14 through the lower apertures 32 as will be described. A dimple 35 formed in the lower edge of the mold tubes 14 stops the plug 36 from dropping out through the mold tube 14. Upper stops (not shown) stop upward motion of the plug 36 during the filling of the mold tube 14 and to equalize the filling of the mold tubes 14. A proximity sensor (also not shown) signals when the plugs 36 for all mold tubes 14 in a row are at the top of the mold tubes 14 and thus that the row is completely filled. At this time the mold cages 12 may be advanced by one row by activation of the hydraulic cylinder 56. The interface between the apertures 32 in the bottom plate 18 and the carrier surface 38 provide a knife edge cleanly separating of the cheese in the filled mold tube 14 from the cheese auger 42 as the mold cages 12 move.

Referring now to FIGS. 1, 2 and 5 the inner vertical wall of each mold cage 12 includes a socket 70 receiving a radially extending fill/drain tube 72 and a drain tube 73 from the central distribution valve 74 positioned about axis 16. Orifices in socket 70 for receiving tubes 72 and 73 are sized slightly larger than the outside diameter tubes 72 and 73, but sealed to the tubes 72 and 73 by an internal O-ring 76. The O-ring connection prevents leakage in the joint so formed, but allows a degree of radial movement of the mold cage 12 with respect to the tubes 72 and 73 and thus with respect to the distribution valve 74 as the mold cages 12 move about the axis 16.

Figure 13:
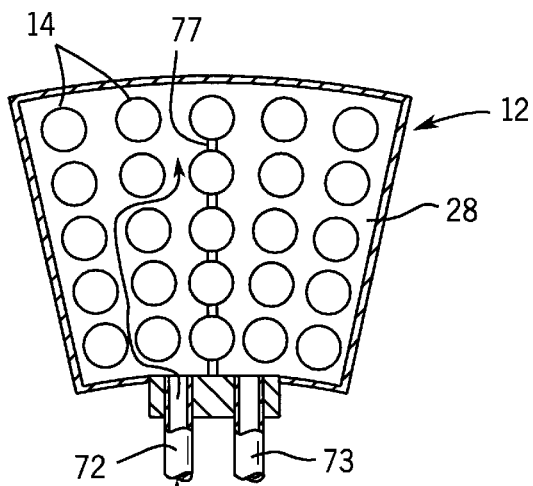
FIG. 13 is a plan view in cross section of a mold cage showing the placement of baffles to ensure even water flow through the mold cage.

Referring now to FIG. 13, as will be described in more detail below, cooling or heating liquid will be introduced through fill/drain tube 72 into water flow volume 28 of a given mold cage 12 and extracted through drain tube 73 and fill/drain tube 72. The mold cage 12 includes baffles 77 placed between the mold tubes 14 to ensure even distribution of the cooling liquid as it is introduced from fill/drain tube 72 and circulated out of drain tube 73.

Referring to FIG. 6, the distribution valve 74 is placed below the lowest surface 78 of the water flow volume 28 so as to allow both tubes 72 and 73 to be used for the final stages of draining the water flow volume 28.

Figure 7:
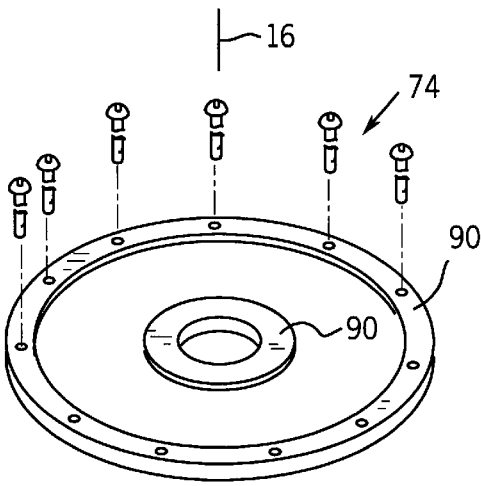
FIG. 7 is a perspective, exploded view of the valve assembly of FIG. 2 showing the mounting of a manifold plate of the valve assembly above a stationary orifice plate and base plate for rotation with the mold cages.

Referring now to FIGS. 2 and 7 the distribution valve 74 includes a manifold plate 80 to which tubes 72 and 73 are attached for each mold cage 12 and which rotates with rotation of the mold cages 12. Passing through the manifold plate 80 are openings 82 connect at their top opening to the tubes 72 and 73 and at their bottom opening, abutting orifice plate 84. Orifice plate 84 remains fixed with respect to the carrier surface 38 and includes valve openings 86 passing thorough the orifice plate 84 to provide connections at different times between the openings is 82 of the manifold plate 80 and openings of a mounting plate 88 below the orifice plate 84 positioned against the orifice plate 84. The openings 82 of the mounting plate 88 connect to sources of heated and chilled water and drains returning heated and chilled water to those sources in a closed loop.

Capture rings 90 hold the manifold plate 80 against the upper surface of the orifice plate 84 while allowing rotation of the manifold plate 80 and hold the orifice plate 84 to mounting plate 88. The upper surface of the orifice plate 84 may include slots to hold a Teflon packing material to provide for a good seal with the undersurface of the manifold plate 80.

Referring now to FIGS. 8, 9 and 10, each of the manifold plate 80, the orifice plate 84 and the mounting plate 88 include a central aperture 92 allowing additional structure to extend upward along the axis 16 of the molder/chiller 10 as may be needed to stabilize or support filling equipment and sensing equipment.

The openings 82 in the orifice plate 84 are arranged at two distinct radii R1 and R2 about the axis 16. The openings 82 at the inner radius attach to the drain tube 73 while the outer radius attaches to the fill/drain tube 72.

As each mold cage 12 moves, the individual rows of mold tubes 14 will first align with the first station 55. At this time, the tubes 72 and 73 for that mold cage 12 will be at position 100a with drain tube 73 connected to arcuate orifice 103 at radius R2 communicating with a chilled water return path through orifice 104 of the mounting plate 88. Fill/drain tube 72 will communicate via arcuate orifice 106 with a source of chilled water provided through orifice 108 of mounting plate 88.

Chilled water will flow through the mold cage 12 associated with the tube 72 and 73 of FIG. 8 while the mold rotates approximately 180° clockwise to station 110 as determined by the arcuate length of the orifices 102 and 106. At station 110, the tubes 72 and 73 will be at positions 100b where the source of chilled water is no longer connected to fill/drain tube 72 via arcuate orifice 106 whereas the drain tube 73 is still connected to the cold water return through orifice 102. At next station 114, tube 73 remains connected to the cold water return and fill/drain tube 72 is also connected to cold water return through orifice 116 providing for a more rapid draining of the mold cage 12. Orifice 116 is connected through orifice 122 in the mounting plate 88 which attaches to orifice 104.

At station 118, tubes 72 and 73 have their openings moved to position 100c wherein fill/drain tube 72 receives a source of heated water through arcuate orifice 130 from pipes attached to mounting plate 88 at orifice 124. Hot water is returned through arcuate orifice 128 communicating with orifice 126 on the mounting plate 88.

At second station 57, the tubes 72 and 73 take on position 100d where they are both connected to hot water drains either through arcuate orifice 128 or aperture 134 communicating with aperture 136 in mounting plate 88 communicating in turn with arcuate orifice 128. Again, this allows rapid draining of the heating liquid from the mold cage 12 in preparation to returning to first station 55.

At second station 57, the cheese has been softened in contact with the water heated mold tubes 14 and may be easily ejected by the pneumatic cylinder set 59 described with respect to FIG. 3. The need for a Teflon or similar coating is eliminated.

As will be understood from this description, the heated liquid and cool liquid having separate sources and drains may be kept isolated thereby reducing the heating and cooling costs of these liquids as they are pumped in a continuous loop through a cooler or heater such as is well known in the art to provide the necessary sources on sinks of fluid.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A molder/chiller for pasta filata cheese comprising:
   a) a plurality of mold cages each providing a separate enclosed liquid flow volume around a plurality of mold tubes;
   b) a cheese inlet port allowing passage of cheese into mold tubes at a first station;
   c) a cheese outlet port allowing passage of cheese out of mold tubes at a second station;
   d) a cage carrier supporting the mold cages for movement between the first and second stations;
   e) at least one liquid flow tube attached to each of the mold cages for separately supplying liquid to the liquid flow volumes of each of the mold cages; and
   f) a distribution valve assembly alternating the supply of heated and chilled liquid among different liquid flow tubes with movement of the mold cages on the mold carrier between the first and second stations, the heated liquid being supplied to the mold cages prior to the second station to release the cheese within the mold tubes from the mold tubes.

2. The molder chiller of claim 1 wherein the mold cages are annular sectors to fit together into a wheel to move about a central axis when supported by the cage carrier.

3. The molder chiller of claim 2 wherein the distribution valve assembly includes a rotary liquid distribution manifold positioned at the central axis.

4. The molder chiller of claim 3 wherein the distribution valve includes an opening passing completely through the distribution valve assembly at the central axis.

5. The molder chiller of claim 2 wherein the liquid flow tubes attach to the mold cages by means of expandable couplings to accommodate radial motion of the mold cages with respect to the central axis.

6. The molder chiller of claim 3 wherein the rotary manifold includes:

a manifold plate moving with the mold cages and having a plurality of circumferentially spaced manifold openings communicating with ones of the liquid flow tubes and wherein the distribution valve assembly alternates supply of the heated and chilled liquid among the different liquid flow tubes by means of a orifice plate having orifices communicating with sources of heated and chilled liquid, the orifices positioned to align and move out of alignment with the manifold openings with relative motion of the orifice plate and the manifold plate with movement of the mold cages.

7. The molder chiller of claim 1 wherein the liquid flow volume of each mold cage is isolated from an inner cheese contacting surface of the mold tubes and wherein each mold cage receives at least two liquid flow tubes and wherein the distribution valve alternately connects the two liquid flow tubes with one of a heated liquid source, a chilled liquid source, a chilled liquid return and a heated liquid return, whereby the heated and chilled liquid is isolated from contact with the cheese contacting surfaces of the cheese tube.

8. The molder chiller of claim 1 wherein the distribution valve assembly is positioned below the liquid flow volumes of the mold cages.

9. The molder chiller of claim 1 wherein each mold cage includes a set of baffles to circulate liquid received from the liquid tubes past the mold tubes prior to the liquid exiting the mold cage.

10. The molder chiller of claim 1 wherein the mold cage includes generally planar opposed stainless steel walls having a plurality of openings having a dimension conforming to an inside dimension of a mold tube opening and are undercut to a dimension corresponding to an outside dimension of the mold tubes and wherein the mold tubes are stainless steel extend between the walls to fit into the undercuts and to be attached by welding at the openings.

11. The molder chiller of claim 1 wherein the mold cage includes generally planar opposed stainless steel walls having a wall thickness and having a plurality of openings and wherein the mold tubes are inserted into the openings less than the wall thickness prior to welding at the openings.

12. The molder chiller of claim 1 wherein the mold tubes extend upward from a lower surface of the mold cages to open downward therefrom and wherein cage carrier is a circular table having an upper surface receiving the lower surface of the mold cages to slide thereon and wherein the cheese inlet port and cheese outlet port are ports cut into the upper surface to align with the openings of the mold tubes at the first and second stations respectively.

13. The molder chiller of claim 12 wherein the support surface of the cage carrier includes a drip ridge at its outer periphery having a channel positioned thereunder.

14. The molder chiller of claim 1 wherein the mold cages included index teeth spaced along an exposed edge of the mold cage with a spacing related to the spacing of the mold tubes and wherein the molder chiller including an indexing arm engaging with the indexing teeth on the mold cages to move the mold cage by an index amount determined by the spacing of the index teeth;

whereby the mold cages carry with them information as to their proper indexing amounts.

15. The molder chiller of claim 1 wherein the indexing arm includes a sensor detecting the indexing teeth so as to limit retraction motion in accordance with the spacing between indexing teeth.

* * * * *

UNITED STATES PATENT AND TRADEMARK OFFICE
CERTIFICATE OF CORRECTION

PATENT NO. : 5,881,639
DATED : March 16, 1999
INVENTOR(S) : Nesheim et al.

It is certified that error appears in the above-identified patent and that said Letters Patent is hereby corrected as shown below:

Column 5, line 40, "devises" should be --clevises--.

Signed and Sealed this

Thirteenth Day of July, 1999

Attest:

Q. TODD DICKINSON

Attesting Officer

Acting Commissioner of Patents and Trademarks